United States Patent
Mills

(10) Patent No.: US 9,732,622 B1
(45) Date of Patent: Aug. 15, 2017

(54) SELF-BALANCING AIR RIDING SEAL FOR A TURBINE

(71) Applicant: Jacob A Mills, Jupiter, FL (US)

(72) Inventor: Jacob A Mills, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 308 days.

(21) Appl. No.: 14/740,317

(22) Filed: Jun. 16, 2015

(51) Int. Cl.
*F01D 11/02* (2006.01)
*F16J 15/34* (2006.01)

(52) U.S. Cl.
CPC ............ *F01D 11/025* (2013.01); *F01D 11/02* (2013.01); *F16J 15/3448* (2013.01); *F05D 2240/55* (2013.01); *F16J 15/342* (2013.01); *F16J 15/346* (2013.01)

(58) Field of Classification Search
CPC ...... F01D 11/02; F01D 11/025; F01D 11/001; F05D 2240/55; F05D 2240/59; F16J 15/342; F16J 15/346; F16J 15/3448; F16J 15/40
USPC .............................. 415/174.1, 174.5; 277/388
See application file for complete search history.

(56) References Cited

U.S. PATENT DOCUMENTS

| | | | | |
|---|---|---|---|---|
| 4,523,764 A * | 6/1985 | Albers | ................... | F16J 15/342 |
| | | | | 277/400 |
| 7,044,470 B2 * | 5/2006 | Zheng | ................. | F16J 15/3448 |
| | | | | 277/400 |
| 7,249,769 B2 * | 7/2007 | Webster | ................ | F01D 11/025 |
| | | | | 277/410 |
| 7,862,046 B2 * | 1/2011 | Lederer | ................. | F16J 15/342 |
| | | | | 277/348 |
| 8,066,473 B1 * | 11/2011 | Aho, Jr. | ................. | F01D 5/081 |
| | | | | 415/112 |
| 8,152,450 B1 * | 4/2012 | Aho | ........................ | F01D 5/081 |
| | | | | 415/112 |
| 9,291,067 B2 * | 3/2016 | Zheng | ................... | F01D 11/003 |
| 9,394,799 B1 * | 7/2016 | Mills | ........................ | F16J 15/34 |
| 9,416,674 B1 * | 8/2016 | Ebert | ...................... | F16J 15/342 |
| 9,587,500 B2 * | 3/2017 | Colombo | ............. | F01D 11/003 |
| 9,631,727 B1 * | 4/2017 | Iguchi | ........................ | F16J 15/36 |
| 2007/0120328 A1 * | 5/2007 | Haselbacher | ............. | F02C 7/28 |
| | | | | 277/404 |
| 2008/0018054 A1 * | 1/2008 | Herron | .................... | F01D 11/02 |
| | | | | 277/409 |
| 2013/0147123 A1 * | 6/2013 | Davies | ...................... | F02C 7/28 |
| | | | | 277/348 |

* cited by examiner

*Primary Examiner* — Matthew W Jellett
(74) *Attorney, Agent, or Firm* — John Ryznic

(57) ABSTRACT

A turbine of a gas turbine engine has an air riding seal that forms a seal between a rotor and a stator of the turbine, the air riding seal including an annular piston movable in an axial direction under the influence of a pressure on one side with a pressure acting on an opposite side that self-balances the air riding seal during the steady state condition of the engine and lifts off the seal during engine transients.

10 Claims, 3 Drawing Sheets

SELF-BALANCING AIR RIDING SEAL FOR A TURBINE

GOVERNMENT LICENSE RIGHTS

This invention was made with Government support under contract number DE-SC0008218 awarded by Department of Energy. The Government has certain rights in the invention.

CROSS-REFERENCE TO RELATED APPLICATIONS

None.

BACKGROUND OF THE INVENTION

Field of the Invention

The present invention relates generally to a turbo machine, and more specifically to a gas turbine engine with an air riding seal formed between a rotor and a stator of a turbine in which the air riding seal is self-balancing.

Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

A seal is required between a stator and a rotor of a turbine in order to prevent a main stream gas flow from leaking into a rim cavity where the rotor disk surfaces can be affected by high thermal loads. One effective seal is an air riding or seal disclosed in U.S. Pat. No. 8,066,473 issued to Aho, J R. on Nov. 29, 2011 and entitled FLOATING AIR SEAL FOR A TURBINE, the entire contents being incorporated herein by reference. The Aho, J R. air riding seal provides a very effective seal with a minimal of wear for the high temperature environment for which the seal is used.

One problem with the Aho, J R. air riding seal is during engine transients such as when the gas turbine engine is shut down or started up. During these transient phases, the pressure balance equilibrium across the seal is perturbed causing the potential for the seal to contact the rotor creating wear and premature failure. The present invention provides a means to ensure the seal doesn't contact the rotor under any circumstances as well as the ability to control the activation of the seal.

BRIEF SUMMARY OF THE INVENTION

A turbine of a gas turbine engine includes an air riding seal formed by an annular piston movable in an axial direction that forms a seal between a rotor and a stator of the turbine. The annular piston includes a radial extending labyrinth tooth that separates a first pressure chamber from a second pressure chamber on which an air pressure acts to move the annular piston in the axial direction. A central passage formed in the annular piston connects the first pressure chamber to a cushion chamber that forms the seal between the rotor surface of the annular piston to move the annular piston toward the rotor surface. A radial orifice connects the second pressure chamber to the central passage to move the annular piston away from the rotor surface.

The air riding seal can include a pressure supply valve with an open and closed position that can supply pressure to the second pressure chamber that will move the annular piston away from the rotor surface.

DETAILED DESCRIPTION OF THE INVENTION

The present invention is an improvement in the floating or air riding annular seal of the air riding seal in U.S. Pat. No. 8,066,473 issued to Aho, J R. on Nov. 29, 2011 and entitled FLOATING AIR SEAL FOR A TURBINE in which the air riding seal is a self-balancing air riding seal. The air riding seal of the present invention is intended for use in a turbine of an industrial gas turbine engine to provide a seal between a rotor and a stator of the engine. During an engine transient such as start-up or shut-down of the engine, the air riding seal would lose pressure and thus make contact with the rotation surface and prematurely wear out the seal surface. Thus, during these transient phases, the self-balancing air riding seal will lift off of the rotor surface so as to minimize of even eliminate any rubbing and thus wear of the seal.

Figure 1:
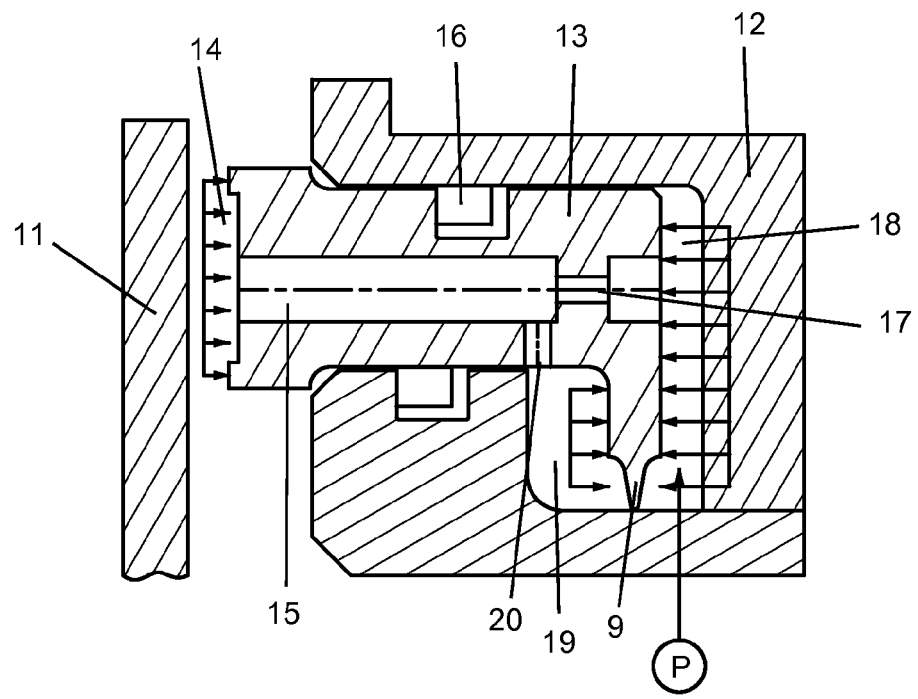
FIG. 1 shows a cross section view of a self-balancing air riding seal of a first embodiment of the present invention in a start-up position.

FIG. 1 shows a self-balancing air riding seal of the present invention with a rotor surface 11, a stator 12 with an annular piston 13 that moves in an axial direction to form the air riding seal, a cushion chamber 14 in which pressurized air forms an air cushion that allows for the annular piston 13 to ride on a thin film of air over the rotor surface 11 that forms the seal, and seals 16 that seal the annular piston 13 within an annular chamber in which the annular piston moves axially.

A pressure switching valve supplies high pressure air (P) to a backside surface of the seal in chamber 18. FIG. 1 is the start-up position in which the annular piston 13 is off from the rotor surface 11. The high pressure from chamber 18 passes through an orifice or passage 17 and 15 into the annular cushion chamber 14 to produce a film cushion of air for the air riding seal. Air pressure from chamber 18 also flows in chamber 19 through passages 17 and 15 and an orifice 20. Pressure in chamber 18 is greater than pressure in chamber 19 and thus the annular piston 13 is pushed toward the rotor surface to close the seal. As the seal closes, the orifice 20 is blocked off which causes the pressure in chamber 19 to increase to a value near to the pressure in chamber 18 and thus a balancing force across the lab seal tooth arm 9 is produced, effectively reducing the closing force.

Air pressure in FIG. 1 is supplied to chamber 18 to a backside surface of the annular piston seal 13 to push the annular piston seal 13 toward the rotor surface 11. The axial passage 17 in combination of the labyrinth seal 9 results in the pressure in chamber 18 to be greater than the pressure in chamber 19. This pressure differential results in the seal 14 being closed. As the seal closes, the orifice 20 is blocked and causes the pressure in chamber 19 to increase due to movement of the annular piston 13 toward the left in FIG. 1, and thus the forces across the lab seal 9 are balanced, effectively reducing the closing force.

Figure 2:
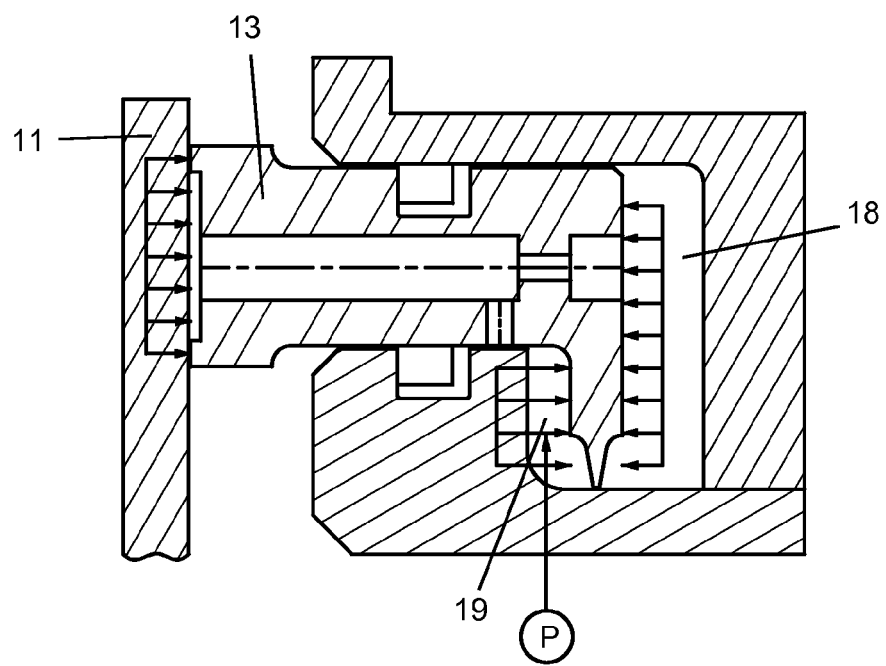
FIG. 2 shows a cross section view of a self-balancing air riding seal of the first embodiment of the present invention in a shut-down position.

FIG. 2 shows a shutdown position of the air riding seal of the present invention. The pressure is applied to the secondary cavity in chamber 19 which forces the seal to move away from the rotor surface 11. The pressure applied to chamber 19 will increase as long as the orifice 20 is still blocked. As the orifice 20 opens, the pressure from chamber 19 will flow through passages 15 and 17 and into the chamber 18 until the forces are equal against the seal 13.

Figure 3:
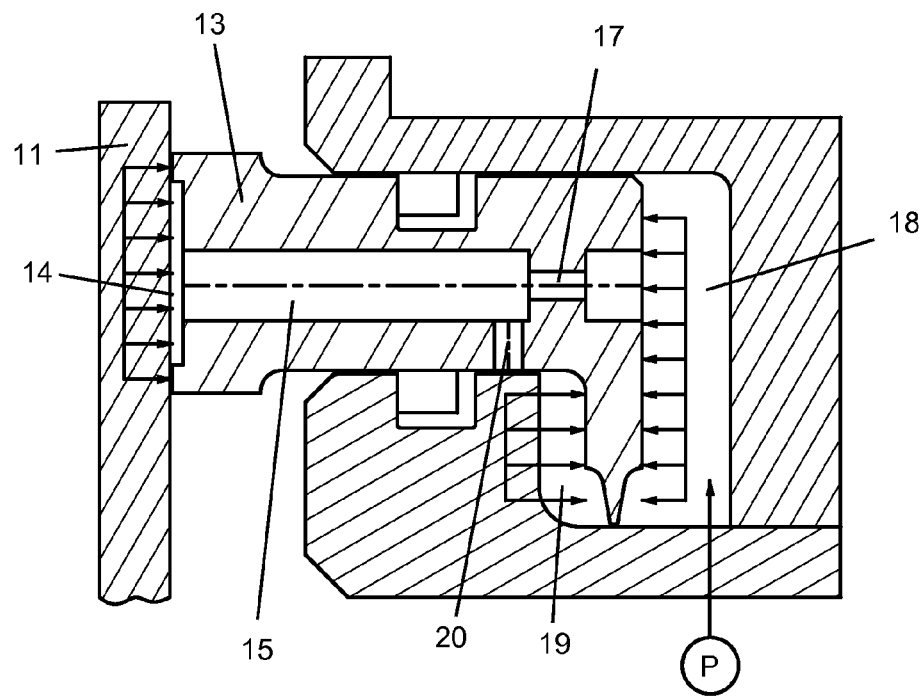
FIG. 3 shows a cross section view of a self-balancing air riding seal of the first embodiment of the present invention in a steady-state position.

FIG. 3 shows a steady state position for the air riding seal. As the seal approaches the rotor 11, the pressure in the cushion chamber 14 increases to produce a hydrostatic pressure balance. Area and pressure ratios can be designed to provide a desired steady state operating clearance between the rotor 11 and the piston 13.

Figure 4:
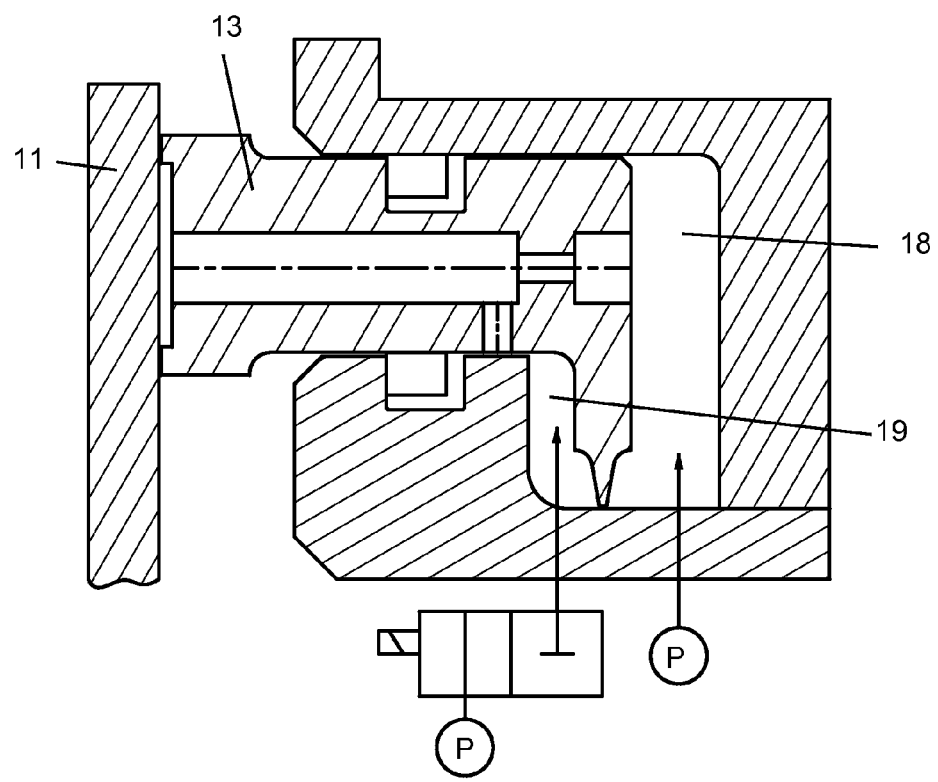
FIG. 4 shows a cross section view of a self-balancing air riding seal of a second embodiment of the present invention in a passive design.

FIG. 4 shows a second embodiment of the air riding seal with self-balancing in which a primary source of pressure (P) is supplied continuously to chamber 18, while chamber 19 is supplied selectively through a valve. The same pressure source can be used for both chambers 18 and 19, or a lower pressure supplied to chamber 19 as long as the friction force is overcome such that the seal moves. In one position of the valve, the pressure source (P) is applied to chamber 19. In the second position of the valve, the chamber 19 is closed off.

Figure 5:
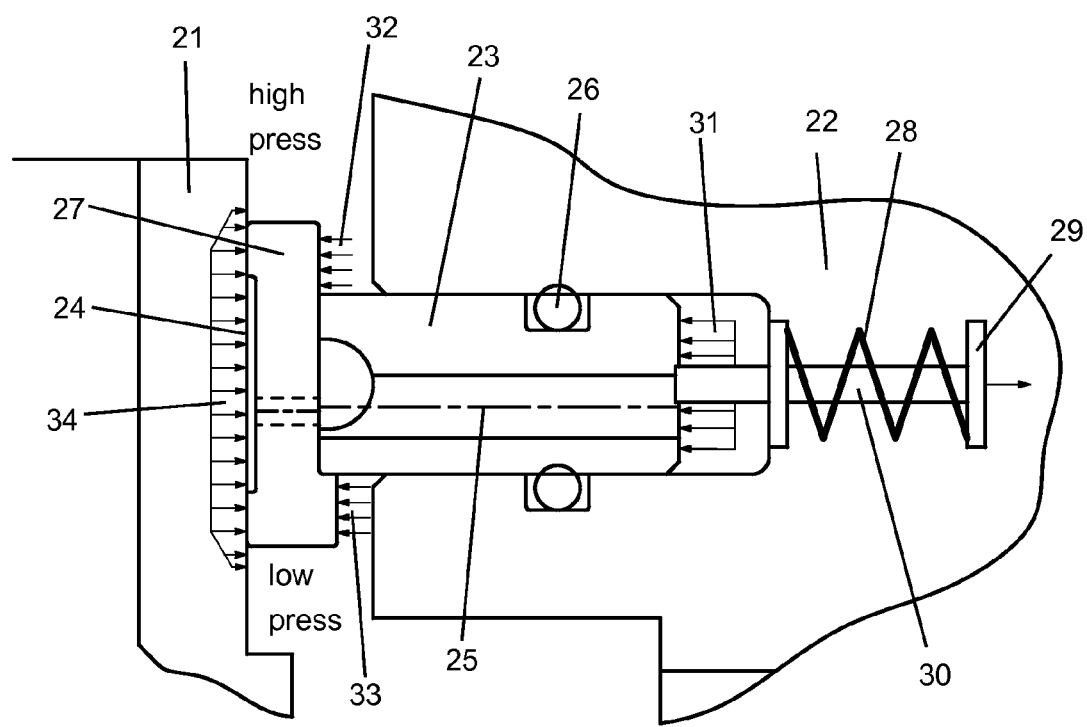
FIG. 5 shows a cross section view of a self-balancing air riding seal in a third embodiment of the present invention.

FIG. 5 shows a third embodiment of the self-balancing air rind seal of the present invention. The FIG. 5 embodiment includes a rotor 21, an annular air cushion chamber 24 formed on a side of a annular piston head 27 attached or integral to an annular piston 23, seals 26, stator casing 22, a central passage w5 within the annular piston 23, a spring shaft 30 and a spring stop 29 on an open end, and a spring 28 over the shaft 30 to bias the annular piston 23 in one direction. The annular piston 23 and the annular piston head 27 can be one piece or two pieces bonded together. The annular piston 23 forms a seal between a high pressure and a low pressure across the air cushion 24 formed between the rotor surface 21 and the annular piston head 27.

During start-up and shut-down of the turbine, the bias force of the spring 28 will pull the seal away from the rotor surface 21. Pressure at 31 plus pressure at 32 plus pressure at 33 equals the pressure at 34. Then the total force equals negative pressure of the spring 28. At the critical pressure, the opening and closing forces are balanced. Pressure at 31 is greater than pressure at 34. The total force is thus zero. Above the critical pressure, the closing forces are greater than the opening forces, and the seal moves toward the rotor 21. The total force is greater than zero. At a steady-state operation, as the seal approaches the rotor the hydrostatic pressure increases and the seal balances to the desired operating clearance.

The geometry of the seal can be designed such that the critical pressure is achieved at a desired operating point (delta P) by adjusting the area ratios. The bias force of the spring can be achieved by a spring, a magnet, or other similar mechanism.

I claim the following:

1. A self-balancing air riding seal between a rotor and a stator in a turbine of a gas turbine engine comprising:
   a stator of the turbine in the gas turbine engine;
   an annular piston movable in an axial direction in the stator;
   a rotor with a rotor sealing surface;
   the annular piston having a cushion chamber that forms an air riding seal with the rotor sealing surface;
   a labyrinth seal tooth extending from the annular piston and separating a first chamber from a second chamber within the stator;
   a central passage within the annular piston connecting the first chamber to the cushion chamber;
   an orifice connecting the central passage to the second chamber; and,
   axial movement of the annular piston blocks the orifice such pressure in the first chamber is substantially equal to the pressure in the second chamber.

2. The self-balancing air riding seal of claim 1, and further comprising:
   in an engine start-up mode, the orifice is open and the annular piston is moved away from the rotor sealing surface; and,
   in an engine steady-state mode, the orifice is blocked and the annular piston is moved toward the rotor sealing surface.

3. The self-balancing air riding seal of claim 1, and further comprising:
   a pressure source of pressurized gas is connected to the first chamber.

4. The self-balancing air riding seal of claim 1, and further comprising:
   a pressure supply valve connected to the second chamber to supply or to block a pressure to the second chamber.

5. The self-balancing air riding seal of claim 1, and further comprising:
   a pressure source is connected directly to the first chamber and indirectly to the second chamber thru a pressure supply valve having an open or a closed position.

6. A turbine of a gas turbine engine, the turbine comprising:
   a rotor with a rotor blade extending therefrom;
   a stator with a stator vane extending therefrom;
   the rotor being adjacent to the stator;
   an annular piston movable in an axial direction within the stator;
   the annular piston having a cushion chamber that forms an air riding seal with a surface of the rotor;
   the annular piston having a labyrinth tooth extending therefrom and having a first pressure surface on one side that will move the annular piston toward the surface of the rotor and a second pressure surface on an opposite side that will move the annular piston away from the surface of the rotor;
   the annular piston having an axial passage connecting the first pressure surface to the cushion chamber; and,
   the annular piston having a radial orifice connecting the axial passage to the second pressure surface.

7. The turbine of claim 6, and further comprising:
   the radial orifice is closed by a section of the stator at a steady state condition of the gas turbine engine; and,
   the radial orifice is opened by the section of the stator at a start-up condition of the engine.

8. The turbine of claim 6, and further comprising:
the first pressure surface is in a first pressure chamber formed by the stator; and,
the second pressure surface is in a second pressure chamber formed by the stator.

9. The turbine of claim 8, and further comprising:
a source of pressure is continuously supplied to the first pressure chamber.

10. The turbine of claim 9, and further comprising:
a pressure regulating valve with an open and closed position is connected to the source of pressure and the second pressure chamber.

\* \* \* \* \*